under the influence of the power applied from the endless rope 18.

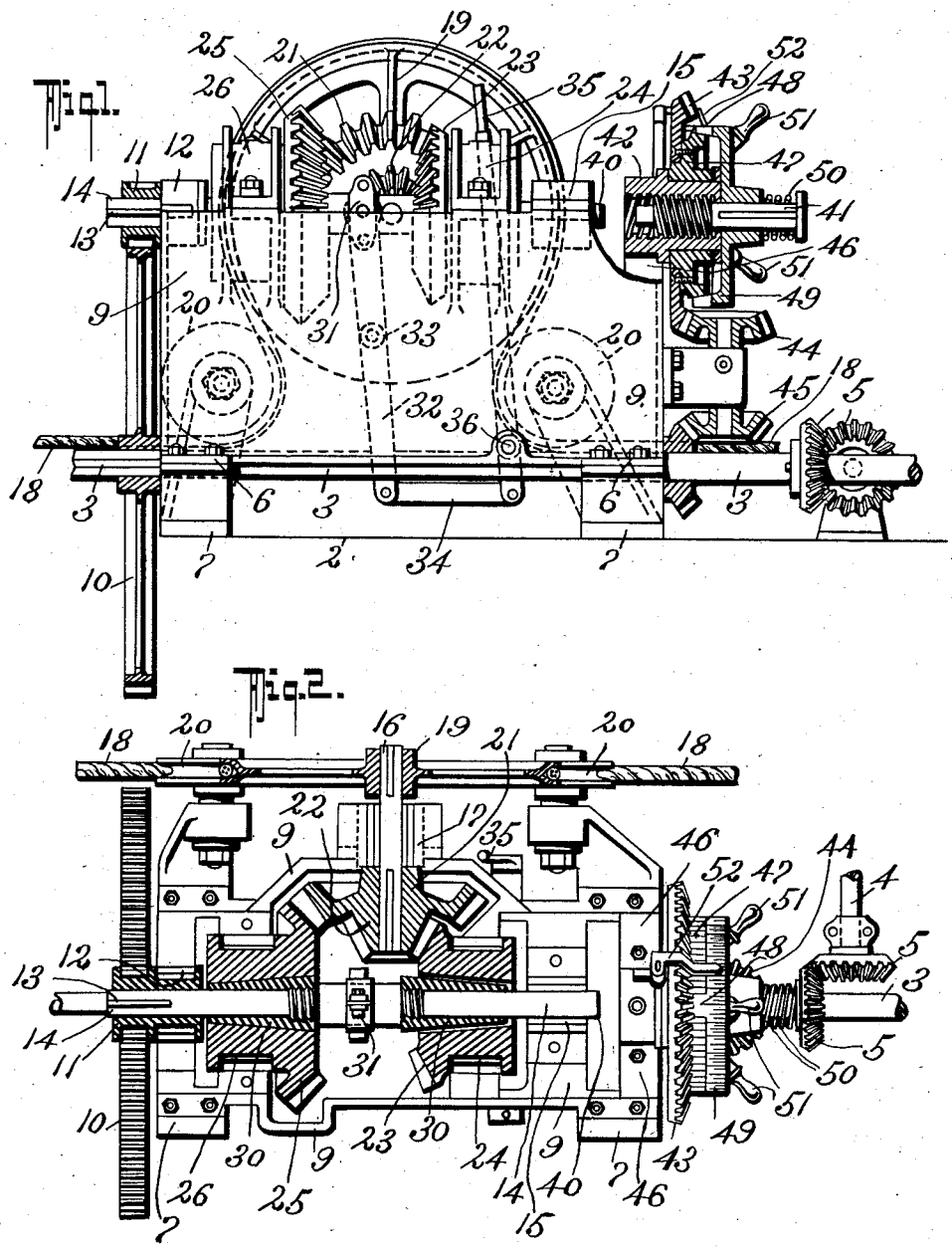

UNITED STATES PATENT OFFICE.

JAMES McLAREN, OF VANCOUVER, BRITISH COLUMBIA, CANADA.

POWER-OPERATED SAW-SET WORKS.

997,403.  Specification of Letters Patent.  Patented July 11, 1911.

Application filed November 30, 1910. Serial No. 594,921.

*To all whom it may concern:*

Be it known that I, JAMES MCLAREN, a citizen of the Dominion of Canada, residing at Vancouver, in the Province of British Columbia, Canada, have invented a new and useful Power-Operated Saw-Set Works, of which the following is a specification.

This invention relates to a power operated set works such as is used to advance toward the saw the knees of the head blocks on which the log to be sawn rests on the carriage, so as to cut any desired thickness from the log and also to recede the head block knees from the saw when it is required to place a new log.

The invention constitutes an improvement of the set works on which Patent No. 902,994 was granted to me on the 3rd of November, 1908 and my object has been to improve in operation and render more simple in design the principle of the design there set forth, and so provide a power operated set works that may be readily adjusted to automatically release itself at any desired thickness of "set" and that will rapidly recede the head block knees when it is required to place a fresh log and that will be uniform and reliable in operation.

The invention is particularly described in the following specification, reference being made to the drawings by which it is accompanied, in which:

Figure 1 is a side elevation and part section of the device, Fig. 2, a sectional plan.

In these drawings 2 represents the upper side of the saw carriage, 3 being the shaft extending lengthwise of the carriage and traveling with it by which the screws 4 of the several head block knees are rotated by bevel gears 5. At the set works mechanism this shaft 3 is carried in bearings 6 in a sub-base 7 on which the casting 9 is secured which carries the remaining mechanism of the set works.

On the shaft 3 is secured a spur wheel 10 the teeth of which mesh in those of a pinion 11 which is rotatable in a bearing 12 of the frame casting 9 and this pinion 11 is driven by a feather key 13 in a shaft 14 which is endwise movable in the pinion, the other end of the shaft being supported in a bearing 15 of the frame casting.

Normal to the axis of the shaft 14 is a shaft 16 in a bearing 17 of the frame 9 and driven by an endless wire rope 18 passing around a grooved sheave 19, the arc of contact of the rope on the sheave being maintained by idler sheaves 20.

On the inner end of the shaft 16 within the frame 9 a double bevel wheel 21, 22 is secured, the teeth of the smaller diameter 22 meshing with those of a bevel gear 23 rotatable in a bearing 24 of the frame, and the teeth of the larger gear 21 meshing on the opposite side with those of a bevel gear 25 rotatable in a similar manner in a bearing 26 of the frame. The bearing hubs of both these bevel gears are flanged as shown to maintain the gears in position. These pinions 23 and 25 are rotatable concentric with the axis of the shaft 14 and are taper bored to conform to oppositely tapered sleeves 30 which are secured to an enlargement of the shaft 14 so as to be rotatable with it. The distance apart of the conical sleeves 30 is such in relation to the conical bores of the pinions 23 and 25 that when in frictional driving contact with one, the other sleeve is clear of contact with the other which is free to rotate independent of the shaft. The shaft 14 is endwise moved to bring one sleeve or the other into frictional driving contact with its pinion by a ring 31 in a groove of a shaft 14 which ring is pivotally connected to a fork lever 32 fulcrumed at 33 and connected by a link 34 to a handle lever 35 fulcrumed at 36. With this mechanism, the movement of the endless rope 18 being constant while the saw carriage is in use, the bevel gears 23 and 25 will be driven in opposite directions and at the speed required to set or recede the head block knees, and by the endwise movement of the shaft 14 either one or the other may be connected to drive that shaft according as the taper sleeve of one pinion or the other is thrown into frictional driving contact. The movement of the shaft 14 is imparted through the pinion and wheel 11 and 10 to rotate the shaft 3 and from it the several head block screws 4 by which the head block knees are advanced or receded.

When the shaft 14 is moved to connect its conical sleeve to the setting pinion 23 the object of the invention is to provide a means by which when the head block knee has been advanced a predetermined amount the shaft will be automatically moved to throw it out of frictional contact with the setting bevel 23 and prevent further movement This object is attained by the following means: In alinement with the shaft 14 and adjacent to its end 40 a screw 41 is threaded into a nut 42 which is removably secured by ears 46 to the casing frame 9 and rotatable on a prolongation of the nut 42 is a bevel gear wheel 43 which is driven by pinions 44, 45 from the shaft 3, so that while this shaft 3 is rotating the bevel wheel 43 is rotating with it preferably at a slower rate. This bevel gear 43 is provided with a serrated driving cone 47 onto which three correspondingly serrated clutch projections 48 from a driving head 49 which is endwise slidable on a feather key on a reduced end of the screw 41 against the resistance of a spring 50 which normally holds the clutch projection of the driving head 49 in contact with the cone 47.

The driving head is provided with three handles 51 by which the head may be drawn back from engagement and turned to advance or withdraw the screw 41 in its nut. The periphery of the driving head 49 is graduated and numbered to indicate positions corresponding to the amount of set of the head block screws and a pointer 52 is secured to the frame and extends toward the periphery of the driving head to facilitate adjustment. By this means the position of the end of the screw 41 in relation to the adjacent end of the shaft 14 may be readily varied and being set at a definite distance from the end of the shaft when the machine is in action that is when the shaft 14 is moved to bring the conical sleeve of the setting pinion 23 into driving contact therewith to rotate the shaft 3 and its coöperative head block screws 4 throughout the length of the carriage, the screw 41 will be rotated to move it through the nut and when it contacts with the end of the shaft it will endwise move that shaft and release the cone 30 from frictional driving contact with the bevel gear 23 through which the head block knees were being advanced. That release of the driving mechanism will occur when the head block knees have been moved through the distance for which the mechanism was set by the graduation on the periphery of the driving head 49.

When the log has been wholly cut up and it is required to run back the head block knees to enable a fresh log to be placed on the carriage the handle lever 35 is thrown to endwise move the shaft 14 to bring the conical sleeve 30 into driving contact with the receding bevel gear 25 when the shaft 3 will be rotated in the opposite direction and at a higher rate of speed. In this case the driving head 49 being normally in driving contact with the cone 47 of the bevel gear 43 the screw 41 will be withdrawn from the end 40 of the shaft 14 and when withdrawn to the full length the shoulder on the screw 41 where it is reduced to receive the driving head 49, will endwise move the driving head against the resistance of the spring 50 so that the set mechanism is returned to its zero position while the shaft 3 continues to rotate until the head block knees are receded a sufficient amount to receive the intended log when the mechanism is thrown out of action by means of the handle lever 35.

It must be understood that the range of the screw 41 does not represent the total range of the head block knees but is made of sufficient length for the maximum size of timber which it is expected will be required to be cut from a log. In the machine as designed the peripheral graduation of the screw driving head 49 ranges to twelve inches so that a log of large size being placed on the head blocks of the carriage and the screw 41 withdrawn to its full limit representing twelve inches, when the head block knees as soon as the machine is started will be moved up toward the saw and will be automatically disengaged in the manner described when the twelve inch movement has been attained and the same operation may be repeated until the log is used up. Similarly the gear may be set to any dimension and the setting mechanism will automatically release at the dimension for which it has been set, thus avoiding the necessity for the operator moving up the head block knees by hand and watching carefully when the desired set has been attained.

The mechanism is simple and direct and is not liable to derangement. It acts with great uniformity in its release and can be rapidly adjusted by an inexpert operator.

Having now particularly described my invention and the manner of its operation, I hereby declare that what I claim as new and desire to be protected in by Letters Patent, is:

1. In an automatic set works for a saw carriage, the combination with the mechanism by which the several head block knees of the carriage are power operated, of means for automatically disconnecting the mechanism said means comprising, a nut fixed to the frame adjacent to the disconnecting clutch, a screw rotatable in the nut with the head block operating mechanism and means for adjusting the distance between the end of the screw and the clutch contact.

2. In a device of the class described, the combination with the mechanism by which the several head block knees of the carriage are power operated and a conical clutch by which such operating mechanism may be disconnected, of a nut fixed to the frame of the machine adjacent to the clutch, a screw rotatable in the nut with the set works mechanism, of means for releasing the nut screw from the mechanism by which it is rotated and for independently rotating that screw.

3. In a device of the class described, the combination of the mechanism by which the several head block knees are operated from an endless wire rope, means for clutching the driving mechanism to an operating shaft said means comprising a cone secured to the shaft which cone fits a corresponding bore in one of the driving wheels, means for automatically disconnecting the driving mechanism when a predetermined movement of the head block knees has been attained said means comprising a screw rotatable in a fixed nut adjacent to the end of the shaft on which is the clutching cone said screw being driven from the mechanism which operates the head block screws, and means for adjusting the end of the screw in relation to the end of the shaft on which is the clutching cone.

4. In a device of the class described, the combination with a mechanism by which the several head block knees are simultaneously operated from an endless wire rope, means for disconnecting the mechanism said means comprising an endwise movable shaft having a friction cone which fits into a corresponding cone in one of the driving gears, means for automatically disengaging the friction cone from driving contact said means comprising a screw rotatable in a fixed nut in proximity to the smaller end of the cone said screw being driven from the mechanism which operates the head block screws, means for disconnecting the screw from the mechanism by which it is driven and for rotating it independent thereof and graduations on the periphery of the screw turning gear and a fixed pointer adjacent to such graduation.

5. In an automatic set works of the class described, the combination with an operating mechanism by which the head block screws are simultaneously rotated, of an endless rope traveling lengthwise of the carriage, a grooved sheave mounted so as to be in driving contact with the rope and secured to a shaft on which is a double bevel wheel, a bevel gear rotatably mounted to be in mesh on opposite sides of the wheel with the teeth of the double gear, a shaft concentric with the two bevel gears and having oppositely coned enlargements to engage corresponding bores in the wheels, a pinion secured to one end of the shaft and meshing with the teeth of a wheel on the head screw operating shaft, levers by which endwise movement may be imparted to the cone shaft, a screw rotatable in a nut in alinement with the cone shaft which screw toward one limit of its movement will contact with the end of the cone shaft and force its cone out of frictional driving contact with the bevel wheel through which it passes, means for driving the screw from the shaft which operates the head block screws, means for disconnecting such driving means and for independently turning the screw.

In testimony whereof I have signed my name to this specification in the presence of two subscribing witnesses.

JAMES McLAREN.

Witnesses:
   ROWLAND BRITTAIN,
   WILLIAM S. SOUTAR.

---

Copies of this patent may be obtained for five cents each, by addressing the "Commissioner of Patents, Washington, D. C."